United States Patent [19]

Knecht et al.

[11] Patent Number: 4,864,355

[45] Date of Patent: Sep. 5, 1989

[54] APPARATUS FOR THE PRODUCTION OF PHOTOGRAPHIC COPIES

[75] Inventors: Hugo Knecht, Schöfflisdorf; René Lüscher, Kloten, both of Switzerland

[73] Assignee: Ciba-Geigy Corporation, Ardsley, N.Y.

[21] Appl. No.: 221,741

[22] Filed: Jul. 20, 1988

[30] Foreign Application Priority Data

Jul. 21, 1987 [CH] Switzerland ........................ 2752/87

[51] Int. Cl.⁴ ........................ G03B 27/32
[52] U.S. Cl. ........................ 355/27
[58] Field of Search ........................ 355/27, 29

[56] References Cited

U.S. PATENT DOCUMENTS

| | | | |
|---|---|---|---|
| 3,308,717 | 3/1967 | Okishima et al. | 355/28 |
| 3,557,675 | 1/1971 | Koll et al. | 355/28 X |
| 3,987,465 | 10/1976 | Sippel | 355/27 X |
| 4,191,369 | 3/1980 | Matsuda et al. | 271/299 |
| 4,405,227 | 9/1983 | Inoue et al. | 355/27 |
| 4,518,241 | 5/1985 | Huss | 354/319 |

OTHER PUBLICATIONS

European Search Report RS 79073 CH.

*Primary Examiner*—Donald A. Griffin
*Attorney, Agent, or Firm*—Burns, Doane, Swecker & Mathis

[57] ABSTRACT

The apparatus comprises a film processor (FP), a printer (P), a paper processor (PP) and a film and paper dryer (D). The two processors are located in parallel, adjacent to each other, with the printer located transversely in front of them. The dryer is located on a side of the processors which is opposite the printer. A special sheet turner (ST) is provided to convey exposed sheets of copy material from the printer (P) to the paper processor (PP). The sheet turner also serves as a decoupling element and a storage buffer, and transfers the sheets to the paper processor with the correct orientation. By means of the specific layout of the individual components and the sheet turner, optimal compactness and functionality, as well as correct ergonomics is obtained.

13 Claims, 5 Drawing Sheets

APPARATUS FOR THE PRODUCTION OF PHOTOGRAPHIC COPIES

BACKGROUND OF THE INVENTION

The invention relates to an apparatus of the type in which a printer and a paper processor are combined in a single structural unit for producing photographic copies, such that sheets of photographic copying material are sequentially transported by a conveyor means through the printer, and then through the paper processor.

The trend in the field of photofinishing is increasingly away from large central laboratories, in the direction of decentralized small and very small laboratories, wherein all of the processing means required (film developer and dryer, printer, paper developer and dryer) are combined into a more or less compact structural unit. Such small or compact laboratories are often operated in stores of photosupply dealers or in supermarkets or other stores, and provide better service for the end consumer (for example, closeness to customers, short delivery times, etc.).

Although an essential requirement of such a small laboratory is compactness, operator friendliness and optimal copy quality must also be assured. Furthermore, interfering or even harmful emissions (for example chemical vapors, etc.) must be avoided under all circumstances. Individual components must also be laid out in a manner such that in case of a defect in one of the components (for example a leaking tank), the other components, to the extent possible, are not damaged.

It is thus the object of the invention to further develop and improve an apparatus for the production of photographic copies of the aforementioned generic type, so that the aforecited requirements are satisfied to the best extent possible In particular, conditions for the most compact configuration possible should be created, while providing structural simplicity and an optimal functional layout of the individual components.

SUMMARY OF THE INVENTION

In accordance with the present invention, an apparatus for producing photographic copies is disclosed, in which a particularly favorable and space saving layout is obtained by placing the printer and the paper processor at right angles to each other. On the other hand, in all of the known apparatuses for producing photographic copies in which a printer and paper processor are combined into a single structural unit, the printer and the paper processor are always in line. The more favorable layout of the present invention is made possible by the provision of a sheet turner, which performs the necessary deflection of the sheets of copy material to be developed. According to a further important aspect of the invention, the said sheet turner preferably also effects the mutual adaptation of the printer velocity relative to the paper processor velocity, and thus acts as a buffer between these elements. It is also possible by virtue of the sheet turner to, in a simple manner, optimally orient the copy material both in the printer and the paper processor (i.e., coated side up in the printer; coated side facing outwardly in the tank of the paper processor), so that the printer itself may be laid out and located in a functionally and structurally optimal manner, and so that various problems related to different coated positions may be avoided in the paper processor.

Finally, the ergonomically most favorable layout is obtained for the operator of the apparatus.

BRIEF DESCRIPTION OF THE DRAWINGS

Other objects and advantages of the present invention will become apparent from the following detailed description of a preferred embodiment as described in conjunction with the accompanying drawings in which.

DESCRIPTION OF THE PREFERRED EMBODIMENT

Figure 1:
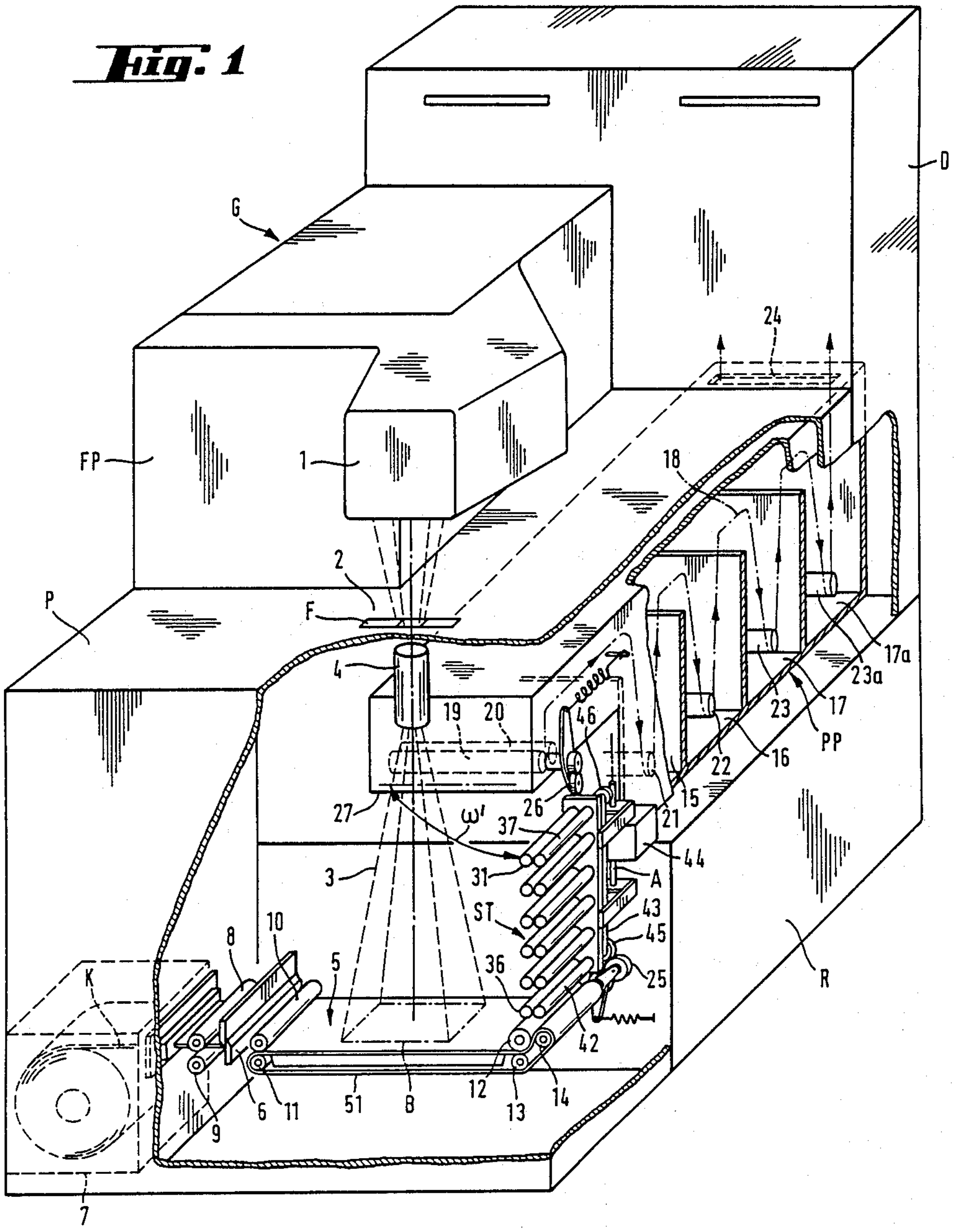
FIG. 1 shows a schematic oblique view of the apparatus.

In FIG. 1 the apparatus of the invention, referred to hereafter briefly as "minilab", is shown with the solid external outlines to an extent necessary for the comprehension of the invention. According to the figure, a copy or enlarger device usually designated as a printer P, a so-called paper processor PP, a film processor FP, a film and paper dryer D and a chemical supply and discharge part R, are commonly located in a light tight housing G. All of these components are, as far as the invention is concerned, standard types. Merely their mutual layout and various details as explained hereinbelow, are novel.

The object and mode of operation of each of the aforecited components of the minilab according to the invention are self-evident: exposed films F from which copies are to be made, are developed in the film processor FP. The printer P copies the developed film in accordance with the customer order onto the appropriate copy material K (i.e., "paper"). In the paper processor PP, the exposed copy material is developed. Finally, in the dryer D, the developed copies and the developed film are dried. Obviously, separate dryers may be provided for the film and the paper. The supply and discharge part R, located below the two processors FP and PP, effects the automatic renewal of the different processing baths in the processes and the removal of the waste materials generated.

Of the printer P, only the elements which are important for an understanding of the invention are shown. These are a copying light source (physically built onto the film processor FP) 1, a film stage 2 for positioning the film to be copied in the imaging beam path 3, an imaging optical device 4, a paper stage 5 for positioning the photographic copy materials K, and a blade 6 for cutting the individual sheets B from the copy material K which is located in a paper cassette 7 and wound into a roll. The paper cassette may be coupled to and uncoupled from the printer P in a known manner. Transport means are further provided in the form of rolls 8–14 and conveyor belts 51, which draw the copy materials K from the cassette 7, position the sheets B after cutting on the paper stage 5 (copy plane) and finally transfer them after their exposure to a sheet turner ST, to be described below. Naturally, all of the operations of the printer P take place under the guidance of an electronic control device, which for the sake of clarity is not shown.

The paper processor is, again, of a conventional type, and comprises a row of successive treatment tanks 15–17 and 17a, through which the individual exposed sheets of the copy material are conveyed in a known manner, on a meandering path 18. Of the transport means required, only certain conveyor rolls 19–23 and 23a are schematically indicated in the drawing. The developed sheets leave the paper processor PP at its outlet 24 and pass directly into the dryer D, from which they may be removed after drying. In the paper processor PP, as in all of the components of the minilab, all functions are regulated by electronic control means.

The configuration and mode of operation of the film processor FP, the dryer D and the supply and discharge part, are immaterial relative to the present invention and require no special explanation.

Figure 3:
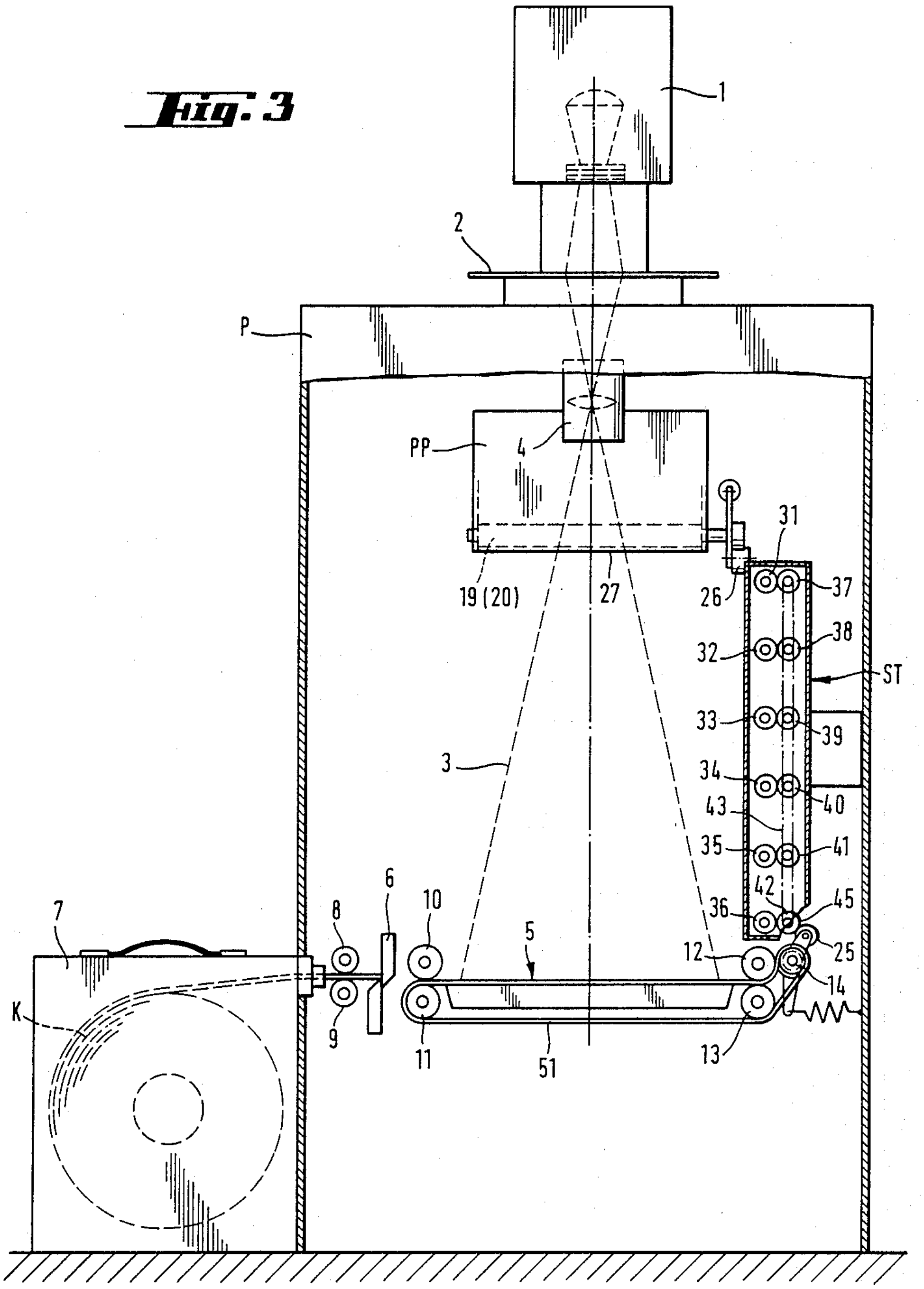
FIGS. 3 and 4 show a partial vertical cross section through the printer part parallel to the frontal face of the apparatus according to FIG. 1, for two different positions of the sheet turner.
Figure 4:
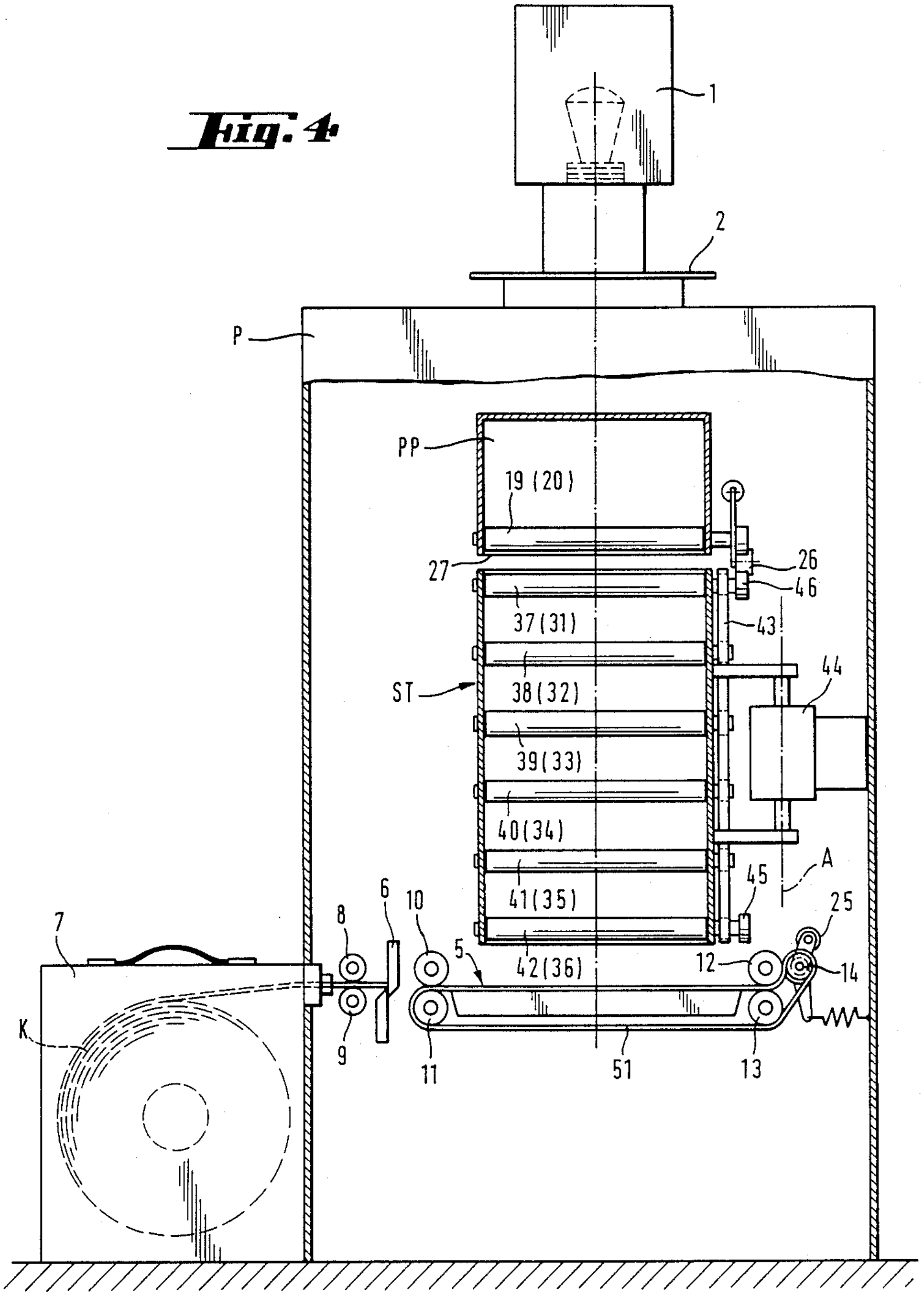
Figure 5:
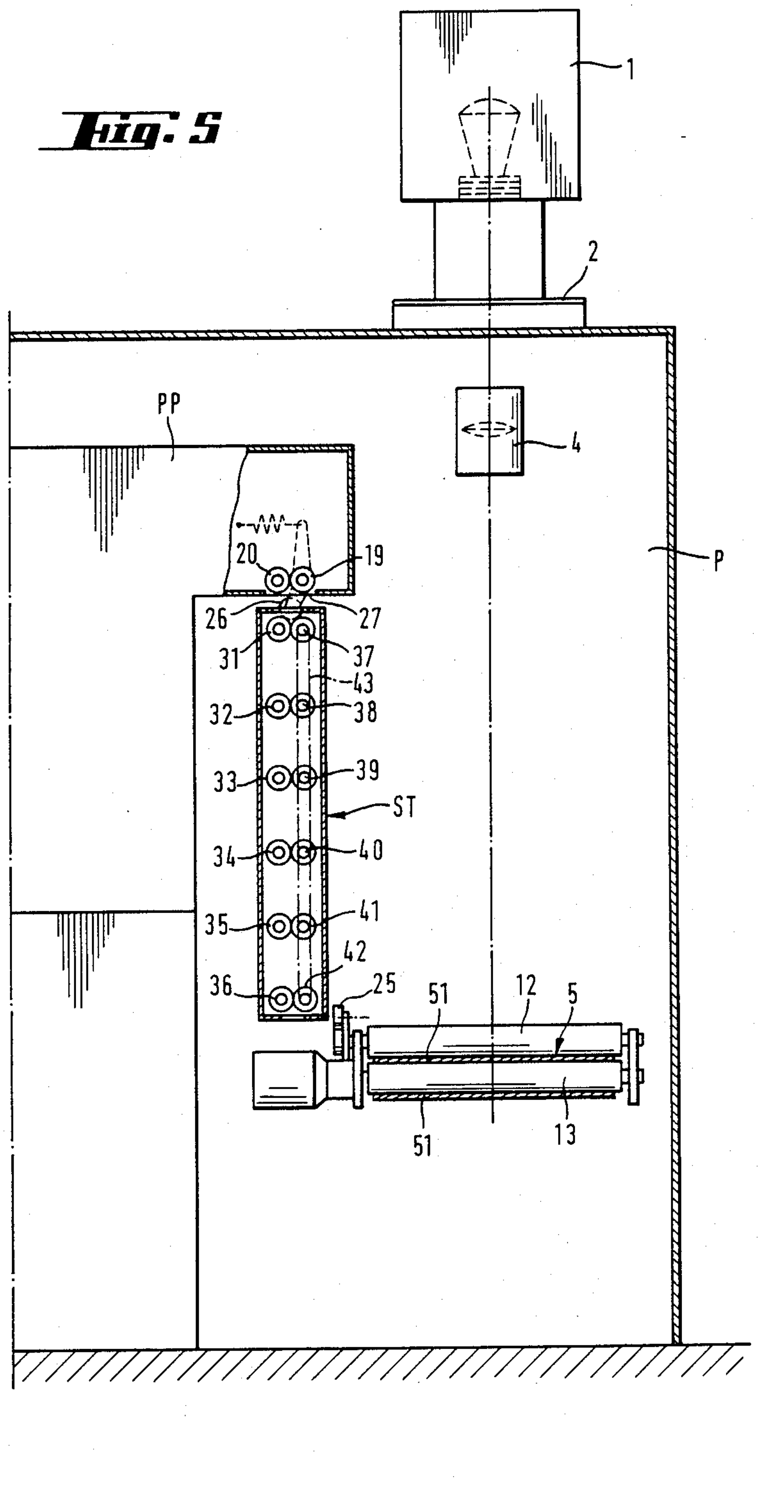
FIG. 5 shows a partial vertical section parallel to the right hand lateral face of the apparatus according to FIG. 1.

The key aspect of the minilab according to the present invention is the aforementioned sheet turner ST. It consists essentially of a roll rack which, for example, comprises 12 rolls 31–42 arranged in pairs (FIGS. 3, 5) and which is capable of pivoting around a vertical axle A by an angle w' of 90°, as shown in FIG. 1. The rolls 37–42 (FIGS. 3, 5 are located on the same side of the rack, and are kinematically connected with each other by means of, for example, a toothed belt 43. A pivoting drive 44, such as a motor or magnet, is shown in FIG. 4 and is provided to pivot the roll rack. In one of the pivot positions of the roll rack (FIG. 1 and 3), its rolls 31–42 are located parallel to the conveyor rolls 8–14 of the printer P, while in the other pivot position they are parallel to the conveyor rolls 19–23 of the paper processor PP.

Figure 2:
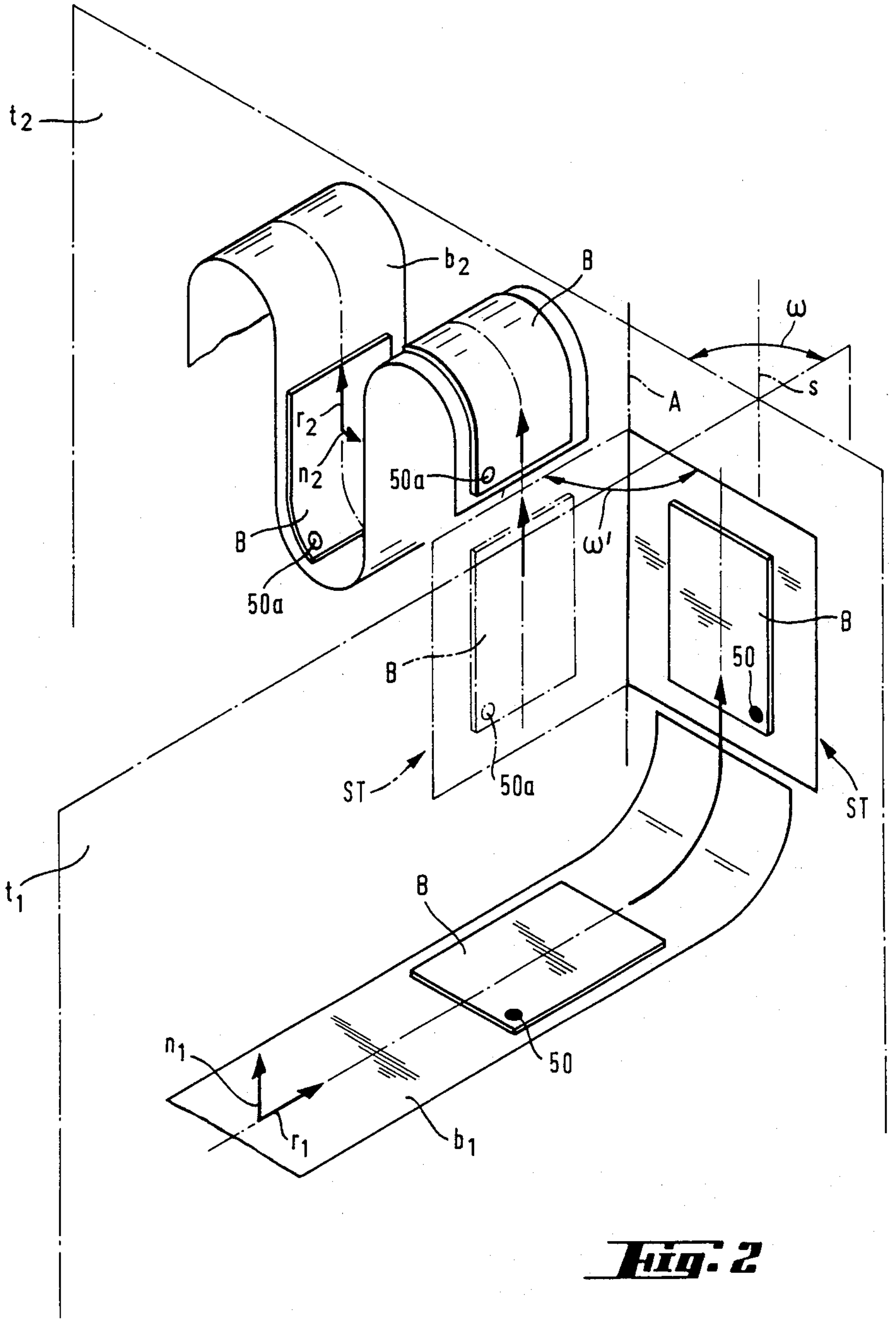
FIG. 2 shows a diagram to visualize the spatial positions of the individual parts of the apparatus.

The spatial conditions of the sheet turner ST are shown schematically in FIG. 2. In the figure, $t_1$ and $t_2$ designate the conveying planes of the printer P and the paper processor PP. The conveyor paths of the copy material sheets are depicted solely for visualization as nonexistent belts $b_1$ and $b_2$. The conveying planes $t_1$ and $t_2$ are applied to the conveyor paths $b_1$ and $b_2$, respectively, by means of arbitrary movement direction vectors $r_1$ and $r_2$, respectively, and arbitrary normals $n_1$ and $n_2$, respectively. Obviously, there exists an infinite number of conveying planes, all of which are, however, parallel to $t_1$ and $t_2$, respectively. For a comprehension of the invention, only the relative orientation as opposed to the absolute position of the conveying planes $t_1$ and $t_2$ is important.

According to a fundamental concept of the invention, the printer P and the paper processor PP are placed at essentially right angles with respect to each other, such that their conveying planes $t_1$ and $t_2$ are at the same angle w with respect to each other. The intersection of the two conveying planes is indicated by s in FIG. 2. The pivoting axle A of the sheet turner ST (symbolized by a rectangle) including the roll rack, is located parallel to the intersection s, such that the aforementioned geometric orientation of the rolls of the sheet turner ST relative to that of the printer P and the paper processor PP is obtained when the rolls of the sheet turner are placed perpendicular to the pivoting axle A.

The rolls 31–42 of the sheet turner ST, which could also be replaced with wheels, disks or the like, do not have their own drives. Rather, they are connected with the conveyor means either of the printer P or of the paper processor PP, depending on their position, and are driven together with them. For this purpose, the printer P is equipped with a spring loaded drive wheel 25, which, for the position of the sheet turner roll rack shown in FIG. 3, elastically abuts against a coupling wheel 45 (FIG. 4) connected with the bottom roll 42 of the rack in a driving relationship. In a similar manner, another coupling wheel 46 is stationarily connected with the uppermost roll 37 of the rack, which for the position shown in FIG. 4 of the sheet turner ST, engages a spring loaded drive wheel 26 mounted on the paper processor (FIG. 5). The two drive wheels 25 and 26 are both connected kinematically with the conveyor rolls of the printer P and the paper processor PP, respectively, and are rotated accordingly.

The sheet turner ST establishes the connection between the printer P and the paper processor PP. In its pivoting position shown in FIGS. 1 and 3, it takes a sheet of exposed copy material from the printer P (existing between its conveyor rolls 12 and 14 in the vertically upward direction) and transfers it in its other pivoting position shown in FIGS. 4 and 5 to the paper processor PP, where it is gripped and further conveyed by the pair of intake rolls, 19 and 20, of the latter. The light tight sheet turner ST also has other important functions. It acts as a storage buffer between the printer P and the paper processor PP and disconnects the latter two components in keeping with the working cycle. Usually, the copy materials are transported in the printer much more rapidly than they are in the paper processor. By virtue of the special drive means of the rolls of the sheet turner ST in accordance with the present invention, the individual sheets may be introduced in a very simple manner at the relatively high velocity of the printer into the roll rack and removed from it at the relatively low velocity of the paper processor. During this phase, the printer is not blocked by the sheet turner and is able to place a new sheet into the copying position and expose it.

The relatively more rapid introduction and slower discharge of the sheets into and from the sheet turner ST obviously may also be effected by its own drive. However, this solution would be considerably more expensive.

As seen from the drawings, the inlet 27 of the paper processor PP and the paper processor itself are located above the copy plane 5 of the printer, and the inlet 27 opens in the downward direction. In this manner, any potentially generated chemical vapor may be prevented from entering the sensitive printer space. On the other hand, the low location of the copy plane 5 makes possible the exposure from above with a straight, undisturbed exposure beam path, which is preferred for numerous reasons, and permits the paper cassette 7 to be located on the ground, which, because of its weight, is desirable for the operator. The sheet turner ST carries out not only the deflection of the exposed sheets of copy material required by the right angle layout of the printer and the paper processor, but simultaneously provides a bridge between the difference in the levels created by the high location of the paper processor, (which is favorable and desirable for additional reasons), and the printer.

The sheet turner ST has yet another important function. In the printer P, the copy material K is located with its light sensitive coated side up, as indicated in FIG. 2 by solid dots. The reverse side 51 of the copy material K is symbolized by the inclusion of rings. In the paper processor PP, it was found to be advantageous to guide the photographic material so that it would be located in the individual treatment tanks with its coated side outside, such that the coated side would face the walls of the tank. It has not been possible in conventional minilabs to simultaneously satisfy both of these conditions. In other words, if the exposure in the printer took place from above in a downward direction, the copy material was running in the paper processor with the coated side inward. If, however, the copy material occupied the position desired in the printer, it was necessary to reverse the beam path in the printer, i.e. from bottom to top, which as discussed previously, is undesirable.

The sheet turner ST according to the present invention eliminates this problem in a very simple manner, by automatically turning the sheets of the copy material so that they are transferred to the paper processor PP with the correct orientation.

It is self-evident that the pivoting motion of the sheet turner ST must be synchronized with the printer P. The necessary electronic controls, which cooperate with infrared light barriers or other position sensors, are familiar to those skilled in the art and require no further explanation.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An apparatus for the production of photographic copies comprising:

a printer and a paper processor combined into a single structural unit, each of said printer and said paper processor having a conveyor plane defined by both a transport direction of sheets of photographic copy material through said printer or said paper processor, respectively, and an arbitrary normal to the copy material within said printer or said paper processor, respectively;

whereby the conveyor plane of said printer is offset at an angle from the conveyor plane of said paper processor;

a conveyor means for sequentially transporting said sheets of photographic copy material through said printer and then through said paper processor, said conveyor means further including:

a sheet turner means for taking said sheets of photographic copy material from said printer, pivoting said sheets around a pivot axle parallel to said conveyor planes, and transferring said sheets to said paper processor.

2. The apparatus according to claim 1, wherein the conveyor plane of said printer is offset from the conveyor plane of said paper processor by an angle of 90 degrees.

3. The apparatus according to claim 1, wherein said sheet turner means is designed as a buffer to mutually adapt relative velocities of said printer and said paper processor to each other.

4. The apparatus according to claim 3, wherein said sheet turner means takes said sheets from said printer at a working velocity of said printer, and transfers said sheets to said paper processor at a working velocity of said paper processor.

5. The apparatus according to claim 4, wherein said conveyor means includes a printer conveyor and a paper processor conveyor which are independent of each other, whereby said sheet turner means is connected with and driven by said printer conveyor during said taking of the sheets, and said sheet turner is connected with and driven by said paper processor conveyor during said transferring of the sheets.

6. The apparatus according to claim 5, wherein said sheets are conveyed to said paper processor through an inlet, said inlet being located higher than an exposure plane upon which said sheets are transported in said printer, and wherein said sheet turner means is located such that it bridges the difference in height between said inlet and said exposure plane.

7. The apparatus according to claim 6, wherein said sheets are transported within said printer with a light sensitive coated side facing up, and wherein said sheets are transported within said paper processor, which includes a plurality of processing tanks having walls, such that said coated side faces said walls.

8. The apparatus according to claim 7, in which said sheet turner means further includes a pivot drive synchronized with said printer.

9. The apparatus according to claim 8, wherein said sheet turner means further includes a roll rack capable of pivoting around said pivot axle, said roll rack, including:

a plurality of rolls at least kinematically connected with each other in part, said rolls being located perpendicularly to said pivot axle; and wherein said printer and said paper processor are equipped with coupling rolls or wheels which are driven by said printer conveyor and said paper processor conveyor, respectively, such that said rolls of the roll rack may be selectively kinematically connected with said coupling rolls or wheels of said printer and said paper processor by the pivoting of said roll rack.

10. The apparatus of claim 9, wherein said sheets are introduced into the paper processor from bottom to top.

11. The apparatus of claim 10, further including:

a film developer and a developer conveyor for transporting a photographic film material through said developer.

12. The apparatus according to claim 11, wherein said film developer and said paper processor are located parallel to each other, and said printer is transversely located in front of them.

13. The apparatus according to claim 12, further including:

a dryer for said film material and said sheets of photographic copy material, said dryer being located on a side of said film developer and said paper processor which is opposite said printer.

* * * * *